(12) United States Patent
Garzarolli et al.

(10) Patent No.: US 6,898,260 B2
(45) Date of Patent: May 24, 2005

(54) FUEL ELEMENT FOR A PRESSURIZED WATER REACTOR AND METHOD FOR PRODUCING CLADDING TUBES

(75) Inventors: Friedrich Garzarolli, Höchstadt (DE); Angelika Seibold, Fürth (DE); Heinrich Ruhmann, Herzogenaurach (DE)

(73) Assignee: Framatome ANP GmbH, Erlangen (DE)

( * ) Notice: Subject to any disclaimer, the term of this patent is extended or adjusted under 35 U.S.C. 154(b) by 1 day.

(21) Appl. No.: 09/968,584

(22) Filed: Oct. 1, 2001

(65) Prior Publication Data

US 2002/0061089 A1 May 23, 2002

Related U.S. Application Data

(63) Continuation of application No. PCT/EP00/02681, filed on Mar. 27, 2000.

(30) Foreign Application Priority Data

Mar. 29, 1999 (DE) .......................................... 199 14 013

(51) Int. Cl.[7] ................................................ G21C 3/00
(52) U.S. Cl. ....................... 376/416; 376/412; 376/457; 420/422
(58) Field of Search ................................ 376/414–417, 376/457, 449, 224, 225, 428; 420/422

(56) References Cited

U.S. PATENT DOCUMENTS

| | | | | |
|---|---|---|---|---|
| 3,105,026 A | * | 9/1963 | Dickson ................... 204/193.2 |
| 3,915,793 A | * | 10/1975 | Andersson et al. ............ 176/78 |
| 4,200,492 A | * | 4/1980 | Armijo et al. ................. 176/82 |
| 4,610,842 A | | 9/1986 | Vannesjö |
| 4,613,479 A | * | 9/1986 | Foster ........................ 376/416 |
| 4,717,534 A | * | 1/1988 | Morita ........................ 376/419 |
| 4,751,044 A | | 6/1988 | Hwang et al. |
| 4,775,508 A | | 10/1988 | Sabol et al. |
| 4,994,233 A | * | 2/1991 | Freeman ...................... 376/428 |
| 5,242,515 A | * | 9/1993 | Worcester et al. .......... 148/672 |
| 5,247,550 A | * | 9/1993 | Perkins et al. ............... 376/416 |
| 5,265,137 A | * | 11/1993 | Busch ......................... 376/414 |
| 5,285,485 A | | 2/1994 | Rosenbaum et al. |

(Continued)

FOREIGN PATENT DOCUMENTS

| | | | |
|---|---|---|---|
| DE | 1 564 697 | | 1/1970 |
| DE | 1564697 B | * | 1/1975 |
| EP | 0 212 351 B1 | | 3/1987 |
| EP | 0 301 295 B1 | | 2/1989 |
| EP | 0 498 259 B1 | | 8/1992 |
| EP | 0 630 514 B1 | | 12/1994 |
| EP | 0 634 752 A1 | | 1/1995 |
| EP | 0 726 966 B1 | | 8/1996 |
| JP | 8 505 225 | | 6/1996 |
| WO | WO 93/17137 | | 9/1993 |

Primary Examiner—Michael J. Capone
Assistant Examiner—R Palabrica
(74) Attorney, Agent, or Firm—Laurence A. Greenberg; Werner H. Stemer; Ralph E. Locher

(57) ABSTRACT

A fuel element for a pressurized water reactor is described. The fuel element contains a laterally open skeleton having control-rod guide tubes each with a first end and a second end, spacers fastened to the control-rod guide tubes, a fuel element head disposed at the first end of the control-rod guide tubes, and a fuel element foot disposed at the second end of the control-rod guide tubes. Gastight cladding tubes are inserted into the skeleton and each is filled with a column of fuel pellets. At least some of the gastight cladding tubes have a multilayer wall. The multilayer wall is formed of a mechanically stable matrix containing a first zirconium alloy disposed in a middle of the multiplayer wall; and a thinner protective layer of a second zirconium alloy alloyed to a lesser extent than the first zirconium alloy. The thinner protective layer is bound metallurgically to the matrix and is disposed on an inside of the matrix facing the fuel pellets.

19 Claims, 9 Drawing Sheets

U.S. PATENT DOCUMENTS

| | | | |
|---|---|---|---|
| 5,539,791 A | * 7/1996 | Garzarolli et al. | 376/417 |
| 5,618,356 A | 4/1997 | Adamson et al. | |
| 5,620,536 A | 4/1997 | Dahlbäck | |
| 5,681,404 A | * 10/1997 | Adamson et al. | 148/421 |
| 5,699,396 A | * 12/1997 | Taylor | 376/416 |
| 5,702,544 A | * 12/1997 | Mardon et al. | 148/672 |
| 5,787,142 A | 7/1998 | Van Swam | |
| 5,790,623 A | 8/1998 | Van Swam | |
| 5,892,807 A | * 4/1999 | Van Swam | 376/416 |
| 5,901,193 A | * 5/1999 | Dahlback et al. | 376/416 |
| 5,926,517 A | * 7/1999 | Van Swam | 376/416 |
| 6,005,906 A | * 12/1999 | Van Swam | 376/417 |

* cited by examiner

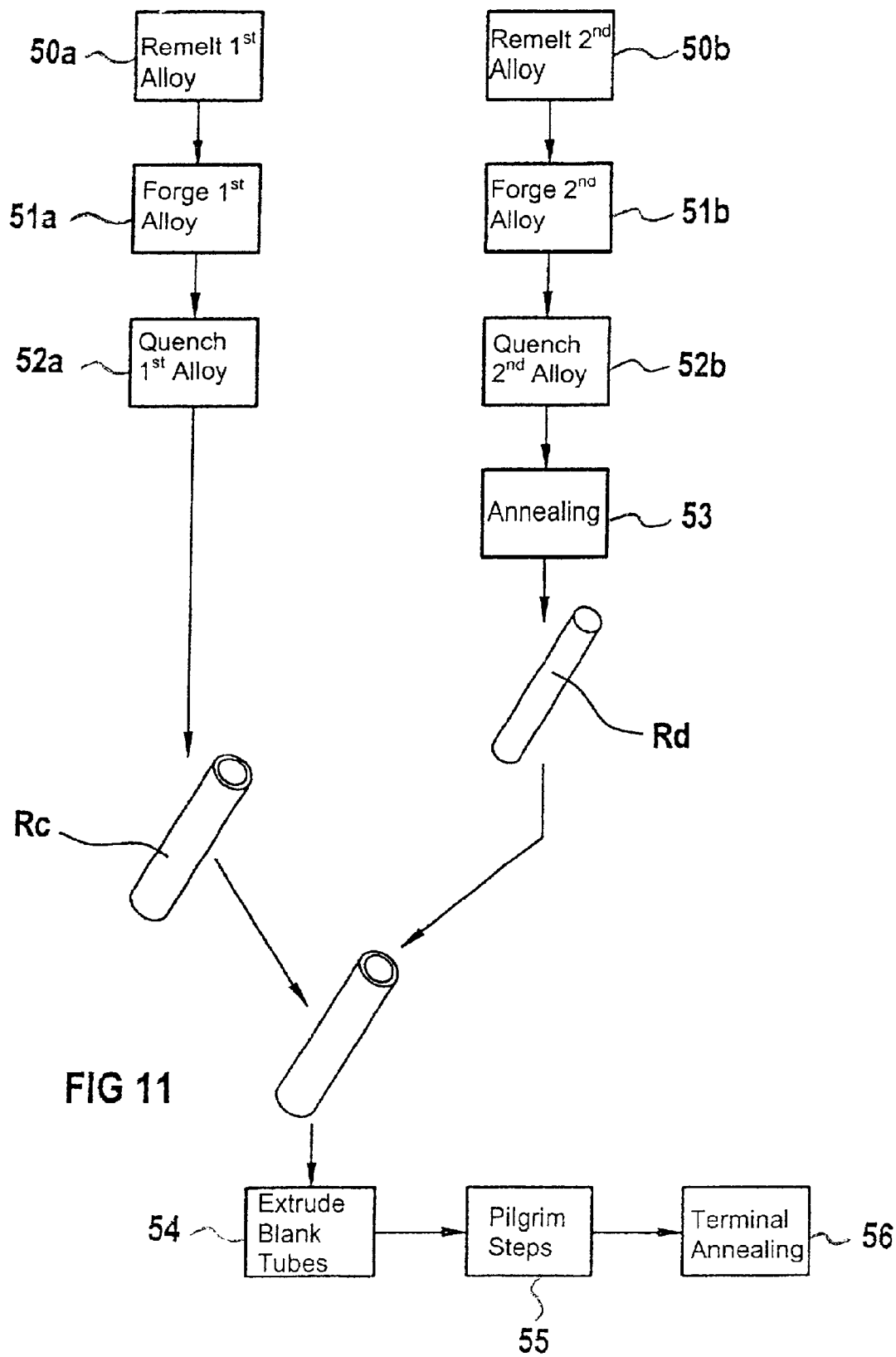

FUEL ELEMENT FOR A PRESSURIZED WATER REACTOR AND METHOD FOR PRODUCING CLADDING TUBES

CROSS-REFERENCE TO RELATED APPLICATION

This application is a continuation of copending International Application No. PCT/EP00/02681, filed Mar. 27, 2000, which designated the United States.

BACKGROUND OF THE INVENTION

Field of the Invention

The invention relates to a fuel element for a pressurized water reactor, with a laterally open skeleton containing control-rod guide tubes, to which are fastened a plurality of spacers and also a fuel element head and a fuel element foot. Gastight multilayer cladding tubes are inserted into the skeleton and in each case surround a column of fuel pellets. The invention relates, furthermore, to a method for producing the cladding tubes.

FIG. 1 illustrates a fuel element of this type, with a head 1, a foot 2 and spacers 3 and 4 that are fastened to guide tubes 5, thus producing a laterally open skeleton, into which fuel rods 6 are inserted. During operation, cooling water flows from the bottom upward through the fuel element and can also enter adjacent fuel elements laterally from the interspaces between the fuel rods. It can also be seen from FIG. 1 that additional mixing grids 7, which serve as carriers for flow guide blades, may be provided between the spacers 4 in an upper part of the fuel element. Such flow guide blades are advantageously likewise provided in the upper part of the fuel element, at least on a top side of the spacers 4, in order to achieve a turbulent mixing of the cooling water and a better flow onto the fuel rods 6.

Corresponding blades are described, for example, in Published, Non-Prosecuted German Patent Application DE 15 64 697 A and are reproduced in FIG. 2. It is also possible, however, to have other spacers (for example, formed of sleeves welded to one another) and other geometries of flow guide blades 8, while a different number of mixing vanes may also be provided in the interspaces between adjacent fuel rods 6.

In the pressurized water reactor, only a small fraction (normally at most 5%) of the liquid cooling water is evaporated on the outer surfaces of the fuel rods, on the contrary the heat generated in the fuel by nuclear fission is discharged essentially in that water having a corresponding temperature and maintained under high pressure is transported away by convection. In contrast, a boiling water reactor operates with lower pressure and lower temperatures, the heat from the fuel rods being transported away, at least in the upper part of the fuel element, essentially by isothermal evaporation in a two-phase mixture. In this case, it is necessary to channel the steam that occurs. The fuel elements are therefore surrounded laterally by fuel element boxes.

The techniques of the boiling water reactor and of the pressurized water reactor have developed in different directions. For the purpose of plant protection and for similar reasons, the pressurized water has admixed with it, for example, lithium hydroxide and similar additives which cannot be used in boiling water and lead to a different water chemistry (for example, a different oxygen concentration). The size and number of fuel rods in the fuel elements and the configuration of control elements in the reactor core are also different. The differences in the temperature and pressure of the cooling water also lead to different loads on the cladding tubes and to a different behavior of the fuel, in particular to different time constants of the reactor core when the latter is considered as a self-contained control system with feedback.

The result of this different control behavior is that the power output of pressurized water reactors is changed only very slowly, that is to say the pressurized water reactor is operated almost virtually in the steady state and is suitable particularly for covering basic loads. For covering peak loads of the consumer connected to the reactor, boiling water reactors, the power output of which is run up, for example, substantially more quickly and in a ramp-like manner, are more suitable. The result of this is that the cladding tubes, which are already exposed on their outer surface, according to the different water chemistry and operating temperatures, to different chemical loads (for example, nodular corrosion in the boiling water reactor or uniform corrosion in the pressurized water reactor) and have to withstand different operating pressures, are also subjected to different loads on the inside.

The outcome of this has been that the cladding tubes of boiling water reactors are formed, as a rule, of a different alloy (to be precise, zircaloy-2) from the cladding tubes of pressurized water reactors for which zircaloy-4 was developed. A zirconium alloy with 2.5% niobium, which is also used in Russian light-water cooled reactors, is also known for the pressure tubes of high-temperature reactors.

Table 1 indicates the standardized composition of industrially pure zirconium for the nuclear industry (so-called "zirconium sponge"), zircaloy-2 ("zry-2"), zircaloy-4 ("zry-4") and zirconium niobium ("Zr/Nb"), oxygen being considered as an impurity acceptable in small quantities, even when, because of its hardening effect on zirconium, it is often desirable and is therefore added.

If use is made of a higher enrichment of the fuel pellets with fissionable isotopes of uranium and/or plutonium and therefore of a greater useful energy content (so-called "burn-up") of the fuel, then the fuel elements can remain in the core for longer, should their cladding tubes be capable of meeting the corresponding requirements due to the longer service life. Therefore, in pressurized water fuel elements, the outer surfaces of the cladding tubes must be particularly resistant to the uniform corrosion occurring in the pressurized water and should not be pressed onto the fuel by the increased pressure, even in the event of relatively long service lives, in such a way that they thereby experience damage. In the development of cladding tubes that meet the increased requirements of a longer service life in the pressurized water reactor, it is therefore necessary to pay particular attention to the mechanical stability of the entire tube and to the resistance of the outer surface to uniform corrosion.

These conditions are fulfilled satisfactorily by single-layer cladding tubes, such as are described in European Patent EP 0 498 259 B and, in general, consist of zirconium with 0.8 . . . 1.7% Sn, 0.07 . . . 0.5% Fe, 0.05 . . . 0.35% Cr, 0.07 . . . 0.2% O, up to about 0.015% Si and up to a maximum of 0.1% Ni. In this context, it has proved particularly important that the metals, Fe, Cr and Ni, which are virtually insoluble in zirconium and are precipitated (so-called "secondary precipitations") as intermetallic compounds ("secondary phases"), have an average particle size of about 0.1 to 0.3μ. The particle size is set by the thermal treatment to which the alloy is subjected after it has first been brought to a temperature at which the precipitations are dissolved (so-called "solution annealing") and has then been rapidly cooled (so-called "quenching"). The resulting size and distribution of the secondary precipitations can be calculated by a "particle growth parameter" and in manufacturing practice are set by a cumulative "standardized annealing duration" A $$A = \Sigma t_i \cdot \exp(-Q/T),$$

in which T is the temperature in Kelvin during a manufacturing step i, $t_i$ is the duration of the manufacturing step and Q corresponds to an activating energy, and the value Q=40,000 Kelvin may be adopted.

FIG. 3 shows the daily growth of the uniform oxidation layer on the surface of a cladding tube formed of zircaloy-4 in a pressurized water reactor at operating temperatures of about 300° C. as a function of the standardized annealing duration A which was used in the production of the cladding tube. In general, for pressurized water reactors, standardized annealing durations of between $2 \cdot 10^{-18}$ and $50 \cdot 10^{-18}$ hours are considered favorable for zircaloy-like alloys of this type, such as are described in European Patent EP 0 498 259 B (Garzarolli et al. in "Zirconium in the Nuclear Industry: Eighth International Symposium", Philadelphia 1989 (ASTM Special Technical Publication 1023), pages 202 to 212). However, such a high annealing duration conflicts with the efforts of a person skilled in the art, by a pilgrim-step method with cold formings, to break down the alloy grain, which likewise ripens into large grains at high temperatures, into small grains by cold formings, in order to increase the mechanical stability of the cladding tube, since a fine grain leads to high stability along with high ductility. Consequently, according to the patent specification mentioned, the high standardized annealing duration is achieved by the quenched material first being forged, still at a high temperature, before it is extruded to form a tube blank and is then cold-formed in subsequent pilgrim steps with moderate intermediate annealings.

Another way is to have a composite tube that, as a so-called "duplex", formed of a relatively thick matrix layer with a thin outer protective layer formed of another zirconium alloy. The matrix ensures the necessary mechanical stability, while the outer protective layer is resistant to the uniform corrosion posing a threat in the pressurized water reactor. Such a duplex is described for the first time in European Patent EP 0 212 351 B, where 0.1 to 1% V and up to 1% Fe is used as alloying additives for the outer protective layer. European Patent EP 0 301 295 B describes a duplex, in which the outer alloy contains 0.2 to 3% Nb and/or a total content of Fe, Cr, Ni and Sn of between 0.4 and 1% (remainder: in each case zirconium of industrial purity). It is known from European Patent EP 0 630 514 B that an outer layer of this type for a zircaloy matrix may also contain a larger total content of Fe, Cr, Ni, Sn, insofar as specific restrictions are maintained for the individual alloying additives, in particular the tin content is below the tin content of the zircaloy. The cladding tubes mentioned have proved appropriate, even under the operating conditions of the pressurized water reactor, and make it possible to achieve the desired long service lives.

The graph of FIG. 3 would be entirely different in the case of a boiling water reactor. There, because of the lower operating temperatures, virtually no uniform corrosion occurs, but oxide pustules are formed. Here, high secondary precipitations cannot act as any of the pustules that, however, are avoided when the material of the secondary phases is finely distributed and has undergone only a particularly low standardized annealing duration. Often, however, cladding tubes of boiling water fuel rods exhibited corrosion damage that emanated from inside the tubes and was attributed to stress crack corrosion. Such damage was minimized by a composite tube, in which a matrix of zircaloy had on the inside a protective layer of industrially pure zirconium, that is to say a soft material, but one susceptible to corrosion. In this case, however, the susceptibility of pure zirconium to corrosion is a disadvantage, since the situation is unavoidable where, in rare instances, due to slight damage in the tube, water from the boiling water reactor enters the cladding tube interior and then triggers corrosion leading to extensive cracks by which the water of the reactor may be contaminated to a substantially greater extent than by a multiplicity of fuel rods with locally limited damage. Instead of a protective layer of pure zirconium, therefore, a protective layer is often used, in which the zirconium contains up to 1% of another alloying additive. Thus, European Patent EP 0 726 966 B describes a cladding tube with a thick matrix layer of zircaloy, in which the secondary precipitations have a particle size of between about 0.03 and 0.1µ, and a lining of zirconium with 0.2 to 0.8% iron is bonded metallurgically to the inside.

The composite tube is particularly advantageous in the boiling water reactor, because, due to the small size of the secondary precipitations on the outer surface, a particularly low A-value becomes necessary, which, in the case of the appropriate alloying of the protective layer on the inside of the cladding tube, likewise brings about only a slight growth of secondary precipitations and grain, so that the inside is both protected more effectively against corrosion and remains soft because it is not subject to any excessive dispersion hardening as a result of Fe secondary precipitations.

However, a cladding tube of this type, configured for boiling water conditions, is entirely unsuitable for pressurized water applications, since the small size of the secondary precipitations on the outer surface would accelerate the uniform corrosion and necessitate an exchange of the cladding tube even after short service lives. On the other hand, the inner lining is not necessary, even under the operating conditions of the pressurized water reactor which have existed hitherto, since, up to now, no damage emanating from the inner surface (stress crack corrosion) has been observed. Moreover, the power output of the pressurized water reactors is not changed rapidly in the ramp-like manner, as is customary in boiling water reactors. Instead, the control conditions of the pressurized water reactor make it necessary, in any case, for the power output to be changed only slowly, there being predetermined for the control a rate of change which also takes account of the fact that the cladding tubes are not to be subjected to inadmissible stress.

In the case of a higher enrichment of the fuel and longer service lives, even the behavior of the fuel itself must be taken into consideration. Since a multiplicity of gaseous fission products occur during decomposition, the fuel swells and thereby experiences an enlargement of volume which leads to a widening of the cladding tube, especially since the latter, in the course of time, particularly under the higher pressures of the pressurized water reactor, is compressed and creeps onto the fuel. When the fuel, which is in contact with the inside of the cladding tube even at a low reactor power output, is quickly heated as a result of a rapid increase in power output customary in the boiling water reactor, however, the thermal expansion of the fuel constitutes an additional load on the cladding tube. In configuration terms, the loads can be taken into account in as much as a gas collecting space is provided at least in the upper end of the fuel rods, a gap is left free between the cladding tubes and the fuel pellets and the fuel element is efficiently and quickly cooled, for example by the initially mentioned flow guide blades on the spacers and, if appropriate, additionally introduced intermediate grids. The load has hitherto been unimportant in the control of the power output of pressurized water reactors, since, in any case, in control terms a restricted rate of change of the power output seems permissible.

SUMMARY OF THE INVENTION

It is accordingly an object of the invention to provide a fuel element for a pressurized water reactor and a method for producing cladding tubes that overcome the above-mentioned disadvantages of the prior art devices and methods of this general type, which, on the one hand, can remain in the reactor for a sufficiently long time and, on the other hand, allows a more flexible operation of the pressurized water reactor, in particular use of the pressurized water reactor for covering peaks in demand of the consumer or power supply network connected to the reactor. In particular, the object, at the same time, is to produce a cladding tube suitable for the novel fuel element.

With the foregoing and other objects in view there is provided, in accordance with the invention, a fuel element for a pressurized water reactor. The fuel element contains a laterally open skeleton having control-rod guide tubes each with a first end and a second end, spacers fastened to the control-rod guide tubes, a fuel element head disposed at the first end of the control-rod guide tubes, and a fuel element foot disposed at the second end of the control-rod guide tubes. Gastight cladding tubes are inserted into the skeleton and each is filled with a column of fuel pellets. At least some of the gastight cladding tubes have a multilayer wall. The multilayer wall is formed of a mechanically stable matrix containing a first zirconium alloy disposed in a middle of the multiplayer wall; and a thinner protective layer of a second zirconium alloy alloyed to a lesser extent than the first zirconium alloy. The thinner protective layer is bound metallurgically to the matrix and is disposed on an inside of the matrix facing the fuel pellets.

The invention proceeds, in this case, from the knowledge that the control restrictions in the control of the power output make it possible per se to have greater rates of change in the power output of a pressurized water reactor than has been conventional hitherto. Flexible operation would therefore be possible if the fuel element were also to withstand the loads occurring during rapid load changes.

To achieve the object, the invention provides the fuel element with a laterally open skeleton containing the control-rod guide tubes, to which are fastened the spacers, the fuel element head and the fuel element foot. Inserted into the skeleton are the cladding tubes which in each case surround a column of fuel pellets in a gastight manner, at least some cladding tubes each having a multilayer wall. In the middle of the wall is located, according to the invention, a mechanically stable matrix of a first zirconium alloy, alloyed to a greater extent, to which a thinner protective layer of a second zirconium alloy alloyed to a lesser extent is bound metallurgically. The protective layer is in this case located on the matrix inside facing the fuel pellets. Preferably, the two zirconium alloys have precipitations of secondary phases that, by thermal treatments with different standardized annealing durations, are ripened to a different average size.

The invention is in this case based on the fact that the configuration of the fuel element satisfies all hydraulic and cooling requirements of relatively long operation under full load or part load, particularly when at least the spacers in an upper part of the fuel element carry, on their side facing away from the flow of pressurized water, flow guide blades for intermixing the pressurized water. The configuration of the fuel rods can also satisfy these requirements, particularly when the cladding tubes are filled with a gas of increased pressure and have a gas collecting space ("plenum") at least at the upper end and the pellets are introduced with an annular gap in relation to the inner surface of the cladding tube.

Moreover, the invention also takes account of the fact that a matrix, in particular when it has the features described in European Patent EP 0 498 259 B, is already sufficiently corrosion-resistant for relatively long operation under full load. If appropriate, a further protective layer, such as is described, for example, in European Patents EP 0 212 351 B, EP 0 301 295 B or EP 0 630 514 B mentioned, may also be bonded metallurgically around the matrix on the outside of the cladding tube.

A matrix of this type, formed of a zircaloy-like zirconium alloy (1 to 1.8% by weight Sn; 0.2 to 0.6% by weight Fe; up to 0.3% by weight Cr; remainder: industrially pure zirconium, if appropriate with an oxygen content of up to 2.0%), best displays the desired properties when it is treated with a standardized annealing duration A of between 2 and $80 \cdot 10^{-18}$ hours.

Another preferred possibility for a matrix having the desired properties is a zirconium alloy with 0.8 to 2.8% Nb (if appropriate, up to 2.7% of further additives, remainder: zirconium of industrial purity, including, if appropriate, an oxygen content of up to 2.0%). Preferably, in this case, the quantity of further additives is below the quantity of the niobium. However, such a niobium-containing zirconium alloy displays the most favorable properties when it is subjected to a substantially lower standardized annealing duration, in particular A lower than $0.5 \cdot 10^{-18}$ h.

Admittedly, the mechanical stability of the alloys is not so high that they ensure the annular gap for a relatively long time and could prevent the cladding tube from creeping down onto the fuel. The alloys overcome the fact that the cladding tube is widened again due to the growth in volume of the fuel after relatively long service lives. The alloys also withstand load changes during which the power output falls considerably below the maximum value for only a short time and is soon raised again to the maximum value.

To control the power output, however, the rate of change must be adapted to the most unfavorable case. This occurs when, during the operation of the reactor, a plurality of load changes have already taken place and then only part-load operation takes place for a relatively long time, in which the fuel contracts thermally and a renewed creeping of the cladding tube consequently occurs. There is then the threat of sudden loads when the reactor is quickly run up again and the fuel expands thermally again. This, in actual fact, requires a particularly high ductility of the cladding tube, which, however, would itself be conducive to undesirably rapid creeping.

Moreover, when, by the control elements being moved out, the reactor is run up from a state in which it was operated only under part load, with control elements inserted partially into the reactor core, the fuel pellets adjacent to the control elements which are moving past experiencing a sudden thermal load, since they were previously protected by the control elements from the high neutron flux to which they are then suddenly exposed. The pellets, which were initially intact according to FIG. 4, therefore shatter and experience a structural change evident from FIG. 5. In this case, individual fragments of a shattered pellet may be displaced and press locally against the inside of the cladding tube. It must therefore be assumed that, after a lengthy period under part load, close contact occurs at least locally between the fuel rod and the fuel ("deconditioning") and then, in the case of a sudden thermal change in volume of the fuel, generates considerable stresses in the cladding tube.

If the cladding tube is formed completely of the alloys mentioned hitherto, only slow increases in power output would therefore nevertheless be possible. According to the invention, however, the stresses are absorbed by the protective layer bound metallurgically to the inside of the matrix and formed of the zirconium alloyed to a lesser extent, the protective layer formed preferably of zirconium of industrial purity which is alloyed with 0.2 to 0.8% by weight of iron. As a rule, the second zirconium alloy contains more than 0.3% by weight, preferably at least 0.35% of iron. The preferred maximum value is around 0.5 or, in any event, is below 0.6%.

However, the alloy displays the most favorable properties when the precipitations of the secondary phases have an average size which corresponds to a standardized annealing duration of about $0.1 \ldots 3 \cdot 10^{-18}$ h.

Such small secondary precipitations of a ZrSe alloy on the inside of the cladding tube are known from the initially mentioned European Patent EP 0 726 966 B and can be manufactured from a composite tube blank produced by the coextrusion of tubes inserted one into the other, but the result of the further processing of the blank is that, after quenching, the two layers acquire either a high A-value, this being detrimental to the action of the protective layer, or a low A-value, that is to say the outside also has correspondingly fine secondary precipitations, which conforms to the requirements of a boiling water reactor, but is harmful to a pressurized water reactor.

However, different precipitation sizes on the inner surface and the outer surface of a cladding tube can be produced by a method that is known as "partial quenching". In this, in the case of a cladding tube which already possesses relatively large secondary precipitations due to relatively long annealing durations, the inside is maintained at a low temperature by a coolant stream, while the outside is increased briefly (for example, inductively) to solution temperature. During cooling, a fine dispersion of precipitations occurs on the outside, that is to say, ultimately, a "metallurgic gradient" with respect to the precipitations in the cladding tube is generated. However, the result of the "metallurgic gradient" is precisely that there are substantially finer secondary precipitations on the outside than on the inside, that is to say precisely the distribution likewise suitable only for boiling water, if both layers are formed of a niobium-free ZrFe alloy.

The "partial quenching" is complicated, but is possible, at least theoretically, in the case where the matrix is formed from a ZrNb alloy.

However, such a cladding tube with a matrix of ZrNb, which is bonded metallurgically to the inside of the cladding tube by a protective layer of ZrFe, can also be produced by the two zirconium alloys first being thermally treated independently of one another, in each case solution annealing, with subsequent different standardized annealing durations A, being carried out. From the first zirconium alloy and at least the second zirconium alloy, a multilayer composite tube is then produced, the wall of which contains in the middle a thick layer of the first zirconium alloy as the matrix, a protective layer of the second alloy being bonded metallurgically to the inside of said wall. The composite tube is then processed further into the finished cladding tube, in such a way that the two layers are in this case subjected to virtually the same thermal conditions, without solution annealing.

In this case, the second zirconium alloy is treated, up to the completion of the cladding tube, with a standardized annealing duration which differs by at least 80% from the standardized annealing duration to which the first zirconium alloy is subjected up to the completion of the cladding tube. Preferably, even before the production of the composite tube, the second zirconium alloy is subjected to a standardized annealing duration of between $0.1 \cdot 10^{-18}$ h and $3 \cdot 10^{-18}$ h, advantageously at most to a standardized annealing duration of below $2 \cdot 10^{-18}$ h.

Preferably, at all events, before the production of the composite tube, a zirconium alloy with 0.8 to 2.8% niobium is treated with a lower standardized annealing duration than the zirconium alloy of the protective layer.

However, a similar method with the same composition and similar treatment of the protective layer (at most a standardized annealing duration of below $3 \cdot 10^{-18}$ h, advantageously below $2 \cdot 10^{-18}$ h) can also be adopted when a zirconium alloy of 1 to 1.8% Sn; 0.2 to 0.6% Fe; up to 0.3% Cr (remainder: industrially pure zirconium) is used as matrix, although the matrix should be treated with a standardized annealing duration of 2 to $80 \cdot 10^{-18}$ h before the production of the composite tube.

For the further processing of the composite tube to form the finished cladding tube, forming steps are necessary (in particular pilgrim steps), between which intermediate annealing is carried out in each case. At the same time, a maximum standardized annealing duration (for example, $3 \cdot 10^{-18}$ h) is preferably also maintained for this further processing. Even annealing durations of below $2 \cdot 10^{-18}$ h can easily be controlled in manufacturing terms.

Insofar as increased protection of the outer surface against uniform corrosion is desired, during the production of the composite tube a third zirconium alloy may also be bound metallurgically to the first zirconium alloy.

In accordance with an added feature of the invention, the second zirconium alloy contains at least 0.2% by weight of iron, a remainder being zirconium of industrial purity.

In accordance with an additional feature of the invention, an iron content of the second zirconium alloy is 0.40±0.04% by weight.

In accordance with another feature of the invention, the second zirconium alloy has precipitations of secondary phases, a size of which corresponds to a standardized annealing duration of about 0.1 to $3 \cdot 10^{-18}$ h.

In accordance with a further feature of the invention, the first zirconium alloy contains 1.3±0.1% Sn; 0.28±0.04% Fe; 0.16±0.03% Cr; 0.01±0.002% Si and 0.14±0.02% O.

In accordance with a further added feature of the invention, the first zirconium alloy has precipitations of secondary phases, a size of which corresponds to a higher standardized annealing duration than an annealing duration to which a size of the precipitations in the second zirconium alloy corresponds.

In accordance with a further additional feature of the invention, the size of the precipitations in the first zirconium alloy corresponds to a standardized annealing duration of 2 to $80 \cdot 10^{-18}$ h.

In accordance with another further feature of the invention, the first zirconium alloy is formed of 0.8 to 2.8% niobium and zirconium of industrial purity and also at most 2.7% of further additives.

In accordance with another added feature of the invention, in the first zirconium alloy, a quantity of the further additives is smaller than a quantity of the niobium.

In accordance with another additional feature of the invention, the first zirconium alloy contains 1.0±0.2% niobium, 0.14±0.02% oxygen, a remainder being the zirconium of industrial purity.

In accordance with an added feature of the invention, the first zirconium alloy contains precipitations of secondary phases, a size of which corresponds to a lower standardized annealing duration, as compared with the second zirconium alloy.

In accordance with an additional feature of the invention, flow guide blades are provided, and at least the spacers in an upper part of the fuel element carry, on a side facing away from a flow of pressurized water, the flow guide blades for intermixing the pressurized water.

In accordance with another feature of the invention, the gastight cladding tubes each have an upper end with a plenum formed therein at the upper end, and including a gas of an increased pressure filling the gastight cladding tubes.

In accordance with a further feature of the invention, the column of fuel pellets have ends and bodies containing virtually no fissionable material disposed at the ends.

In accordance with another added feature of the invention, a further protective layer of a third zirconium alloy which is thinner than the matrix and is bonded metallurgically to an outside of the multilayer wall.

In accordance with another additional feature of the invention, the second zirconium alloy contains at least 0.30% by weight of iron, a remainder being zirconium of industrial purity. optionally, the second zirconium alloy contains up to 0.8% by weight of iron, the remainder being zirconium of industrial purity. Alternatively, the second zirconium alloy contains at most 0.6% by weight, of iron, the remainder being zirconium of industrial purity.

In accordance with another further feature of the invention, the first zirconium alloy contains at least 1.2% Sn, at least 0.24% Fe and at least 0.10% Cr, a remainder being zirconium of industrial purity. Optionally, the first zirconium alloy contains at most 1.5% Sn, at most 0.5% Fe and at most 0.25% Cr, a remainder being zirconium of industrial purity.

In accordance with a concomitant feature of the invention, the size of the precipitations in the first zirconium alloy corresponds to a standardized annealing duration of $30 \pm 10 \cdot 10^{-18}$ h.

Other features which are considered as characteristic for the invention are set forth in the appended claims.

Although the invention is illustrated and described herein as embodied in a fuel element for a pressurized water reactor and a method for producing cladding tubes, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 11 is a flow diagram of the method steps for the production of the second exemplary embodiment.

DESCRIPTION OF THE PREFERRED EMBODIMENTS

Figure 1:
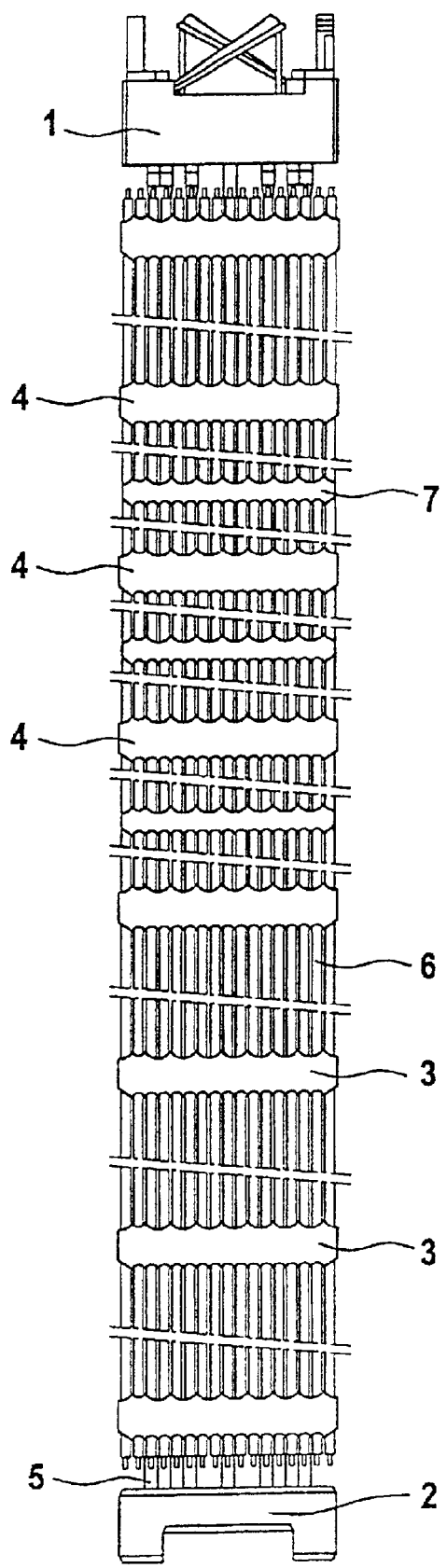
FIG. 1 is a diagrammatic, side-elevation view of a pressurized water fuel element according to the invention.
Figure 2:
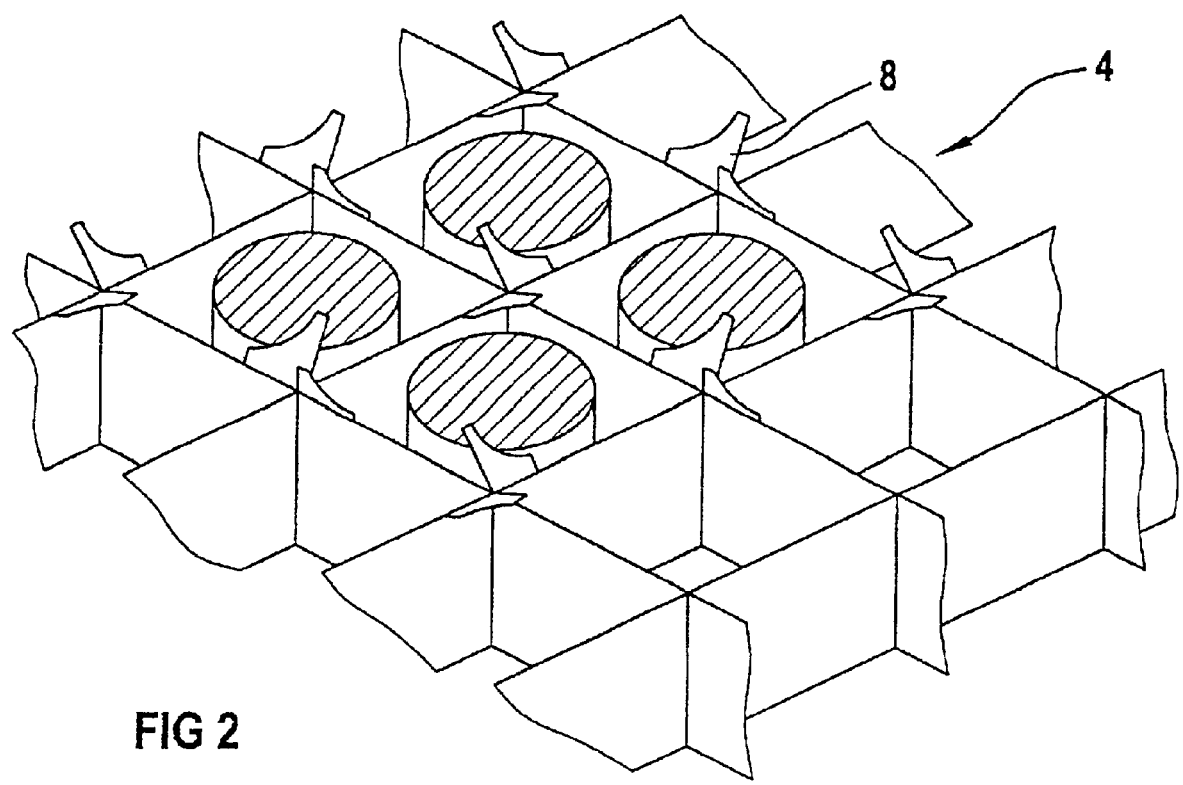
FIG. 2 is a fragmentary, perspective view of guide blades that are advantageous at least on some spacers or intermediate grids.
Figure 3:
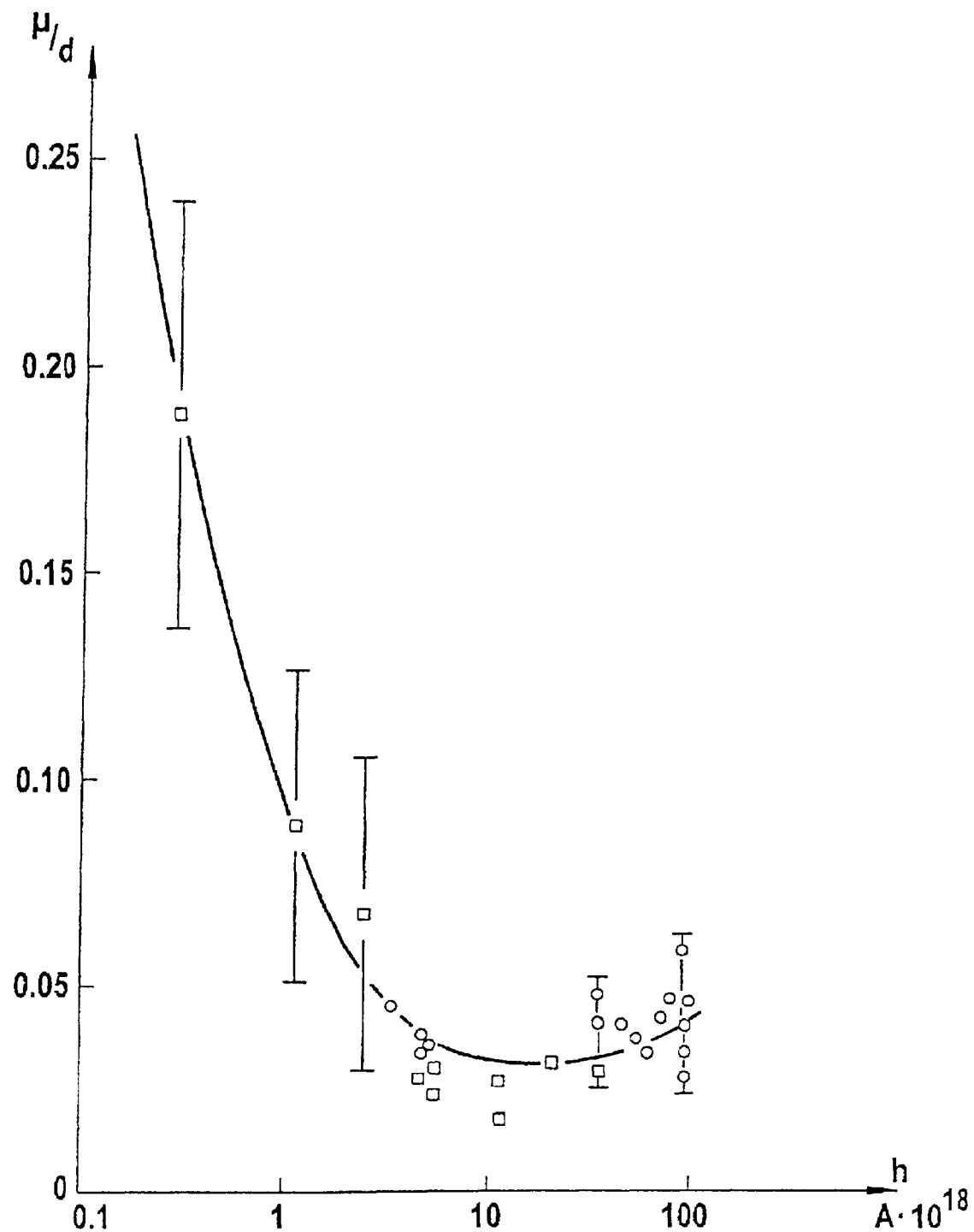
FIG. 3 is a graph showing a corrosion rate on the parameter A of the standardized annealing duration on a surface of a pressurized water fuel rod.
Figure 4:
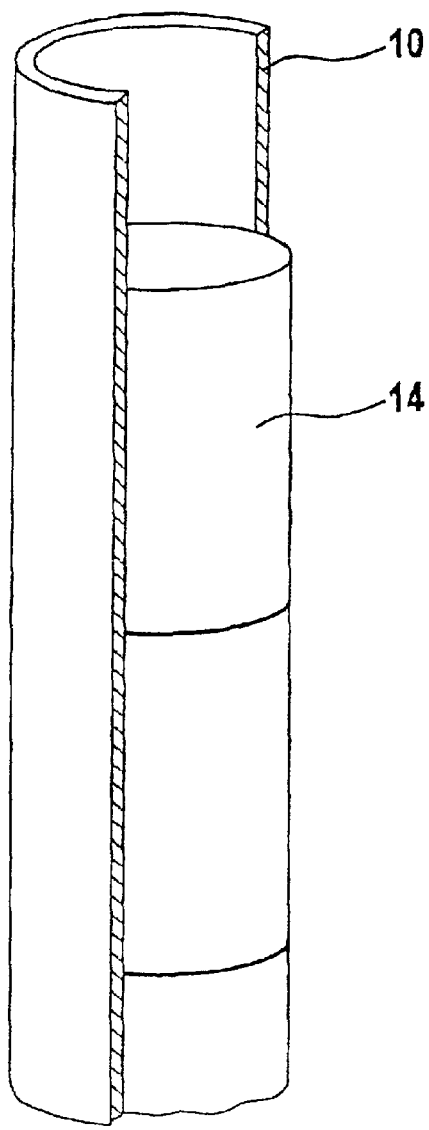
FIGS. 4 and 5 are cut-away, perspective views of a described state of a fresh fuel pellet before and after a ramp-like increase in power output.
Figure 5:
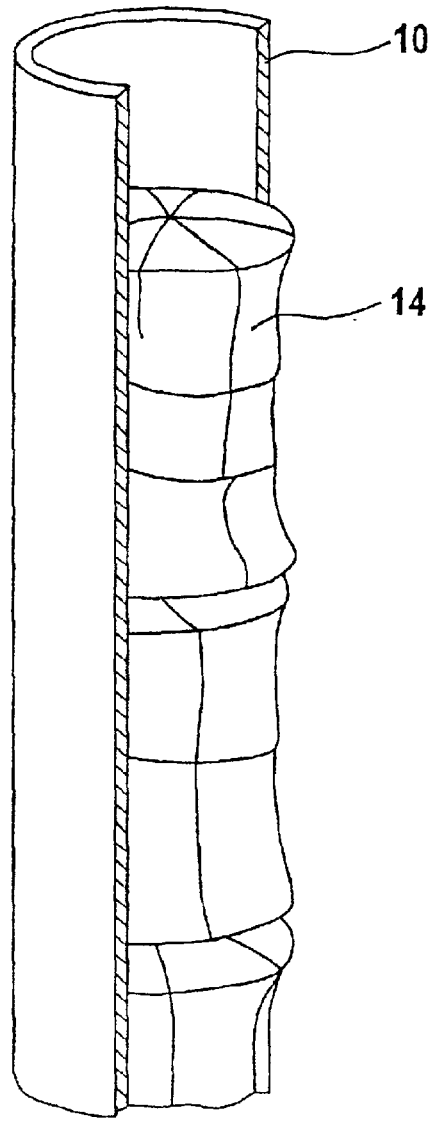
Figure 6:
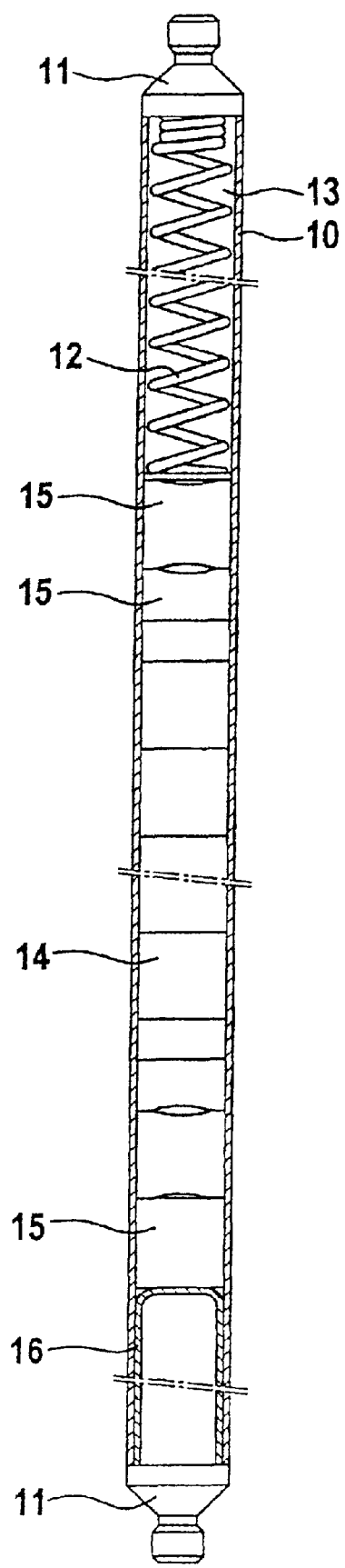
FIG. 6 is a cross-sectional view of an advantageous interior of a fuel rod.

Referring now to the figures of the drawing in detail and first, particularly, to FIG. 6 thereof, there is shown a cladding tube 10 of the fuel rods 6 is in each case closed in a gastight manner at upper and lower ends by an end plug 11. At the upper end a spring 12 subjected to compressive stress ensures that a corresponding plenum 13 is maintained at least at the upper end. A column of fuel pellets 14 contains in each case, at its upper and lower end, a body 15 that contains virtually no fissionable material and may consist, for example, of aluminum oxide or else natural uranium or depleted uranium. In this case, in order to increase conductivity between the pellets 14 and the cladding tube 10, the cladding tube 10 is filled with a high-pressure gas (for example, helium).

In the present case, a supporting body 16 at the lower end of the fuel rod also keeps free a corresponding plenum.

Figure 7:
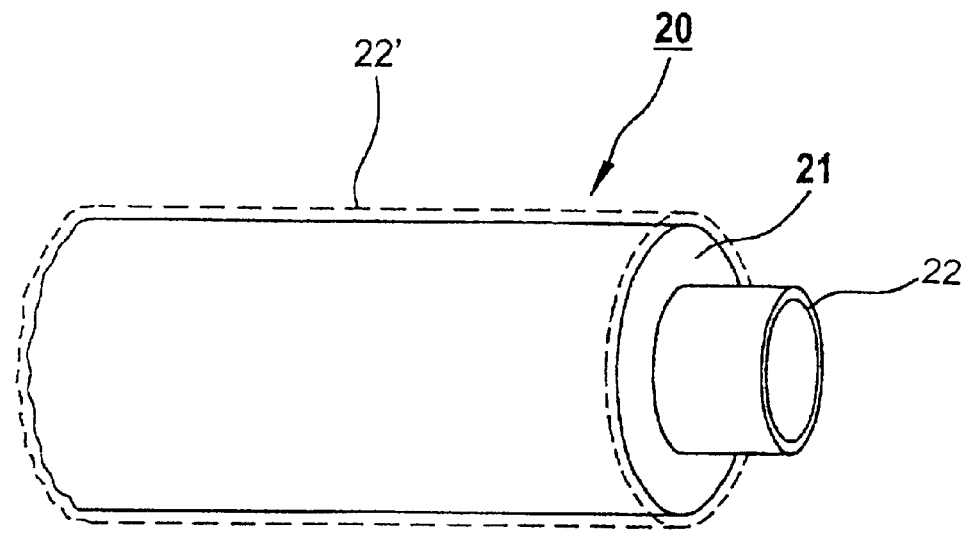
FIG. 7 is a perspective view of a cladding tube according to the first preferred exemplary embodiment.

The outside diameter of the cladding tube is about 9.55 mm, and its wall thickness is about 0.61 mm. According to FIG. 7, a cladding tube 20 is formed of a matrix 21, the thickness of which is about 75 to 95% of a cladding tube wall. A protective layer 22 is bound metallurgically to the matrix 21 on the inside of the cladding tube 20, and it is also indicated that a further protective layer 22' may also be attached to the outside.

Table 2 indicates the lower and upper limit values for the composition I of the matrix 21. Here, the values given in brackets in each case describe preferred relatively narrow limits for the contents of the individual alloy constituents or the particularly preferred limit values for the accompanying elements of the alloy constituents which are already contained as impurities in the zirconium of industrial purity ("sponge", see Table 1) and can be maintained for the lower limits which are also advantageous, as in the case of oxygen or silicon.

In the preferred exemplary embodiment, the matrix 21 contains 1.3±0.1% Sn; 0.28±0.04% Fe; 0.16±0.03% Cr; 0.01±0.002% Si and 0.14±0.02% O. The size of the precipitated secondary phases is in this case $30 \cdot 10^{-18}$ h.

The protective layer 22 consists of 0.4±0.04% Fe and zirconium sponge, the precipitation size being determined by $A = 1 \cdot 10^{-18}$ h.

Figure 8:
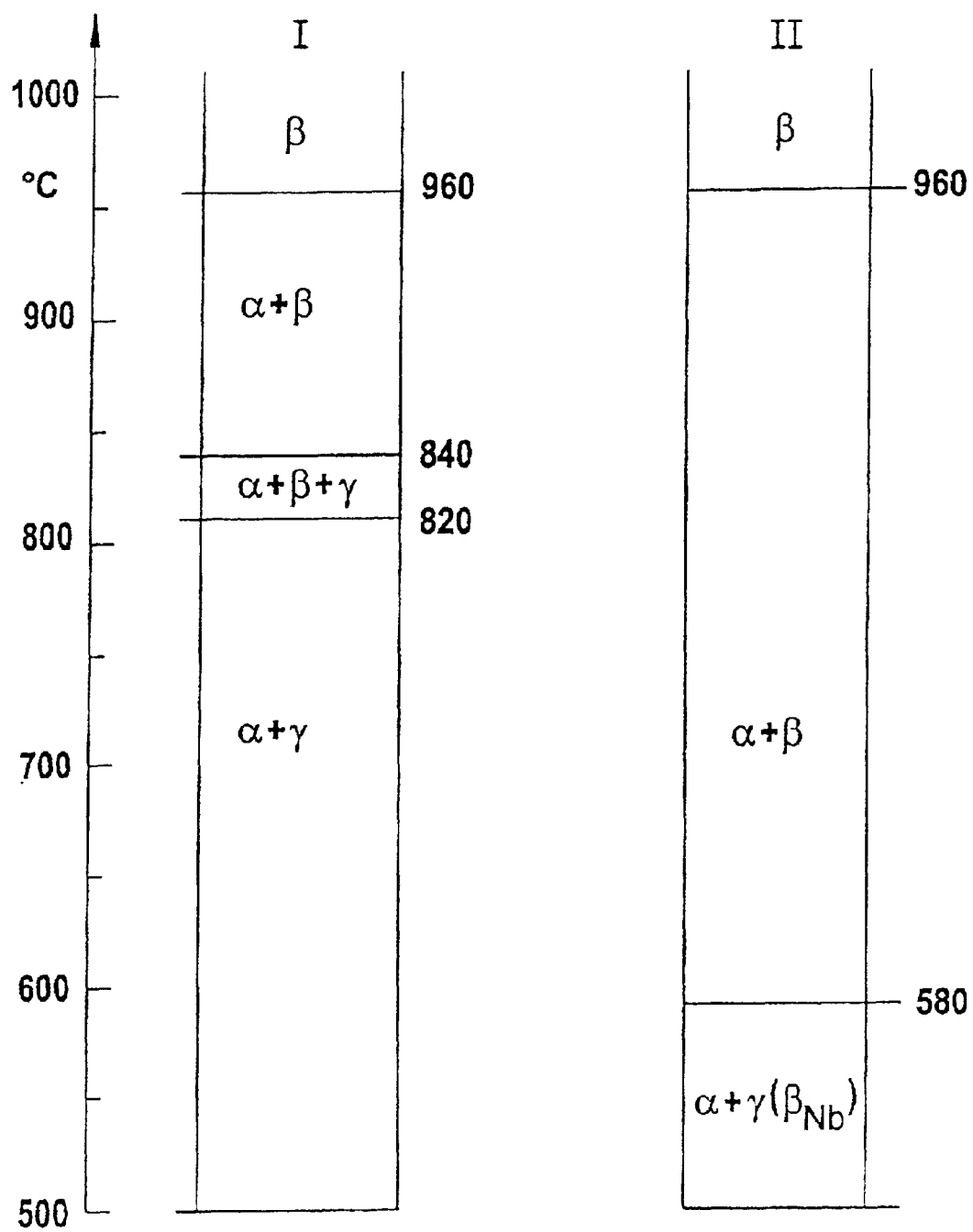
FIG. 8 is a graph showing phase ranges of the alloys used as a matrix in the two preferred exemplary embodiments.

In the second phase, the precipitations consist virtually of intermetallic ZrFe compounds, in the case of the matrix 21 of mixed compounds of zirconium with iron and chromium, and, in FIG. 8, it can be seen under I that, up to temperatures of about 820° C., there is an α-phase of ZrSn in addition to the corresponding secondary phase γ of these precipitations. In the range between about 820 and 960° C., there is also a β-phase of ZrSn in addition to the α-phase, and at about 840° C. ("solution temperature") the γ-phase of the intermetallic compounds becomes a solution. Above 960° C., only the β-phase with the dissolved precipitations is still stable. If, therefore, the matrix is heated into the β-range (temperatures of above 960° C.) and is then rapidly cooled, a fine-grained α-phase is first formed, in which part of the iron is distributed in a finely dispersed manner as precipitations of the γ-phase, while the rest of the iron remains bound as metastable supersaturation in the α-phase. In this case, the finely dispersed precipitations correspondingly form nuclei, on which the excess iron fraction is accreted the more rapidly and the more highly, the higher the temperature and duration in which the matrix material is exposed to further thermal treatments in the α-range (temperatures of below 820° C.).

To produce the cladding tube 20, first, the first alloy of ZrSnFeCr, provided for the matrix 21, is remelted a plurality of times under a vacuum in a step 30a (FIG. 9) to homogenize the alloy constituents, in a step 31a the alloy is forged to a shape suitable for the processing of a tube blank and, in a further step 32a, the alloy is rapidly cooled ("β-quench") from a temperature in the β-range (above 960° C.). This may be followed by further forging (step 33), the first tube blank Ra being produced at the latest during a step 34. The step 34 is also followed by further annealings, in order to set the parameter $A=30 \cdot 10^{-18}$ h in the first tube blank.

In a similar way, the second zirconium alloy (ZrFe) provided for the protective layer 22 is likewise remelted in a step 30b, in a step 31b is heated into the β-range (temperatures of above 960° C.) and in the step 32b is rapidly cooled. During these steps, a second tube blank Rb is also produced. In this case, the β-quenching (step 32b) is followed by virtually no further heating, instead the two blanks, the shapes of which have been adapted to one another, are placed one into the other, welded to one another and jointly extruded in a step 35. This coextrusion does not, in practice, contribute to the ripening of the precipitations, so that, in the composite tube obtained, the matrix material possesses the value $A=30 \cdot 10^{-18}$ h and the second zirconium alloy possesses virtually the value A=0. Subsequently, a plurality of pilgrim steps 36 are carried out, between which brief annealings at temperatures well below 820° C. are carried out in each case, in order to recover the cold-formed material and prepare it for the next pilgrim step. What is then achieved by terminal annealing 37 is that the parameter $A=1 \cdot 10^{-18}$ h is set for the entire processing of the composite tube to form the finished cladding tube, that is to say the first zirconium alloy of the matrix has the value $A=31 \cdot 10^{-18}$ h, but the second zirconium alloy of the protective layer has the value $A=1 \cdot 10^{-18}$ h.

For steps 33 and 34, a range $A=2$ to $80 \cdot 10^{-18}$ h is maintained, values of above $5 \cdot 10^{-18}$ h being advantageous. Values of above $60 \cdot 10^{-18}$ h signify long annealing durations at high temperatures which do not seem necessary. For steps 35 to 37, in general, values A of below $2 \cdot 10^{-18}$ may be maintained. For the finished zirconium alloy of the matrix, therefore, values $A=5$ to $60 \cdot 10^{-18}$ h seem advantageous, while $A=1$ to $3 \cdot 10^{-18}$ h should be maintained for the second zirconium alloy of the protective layer.

Figure 10:
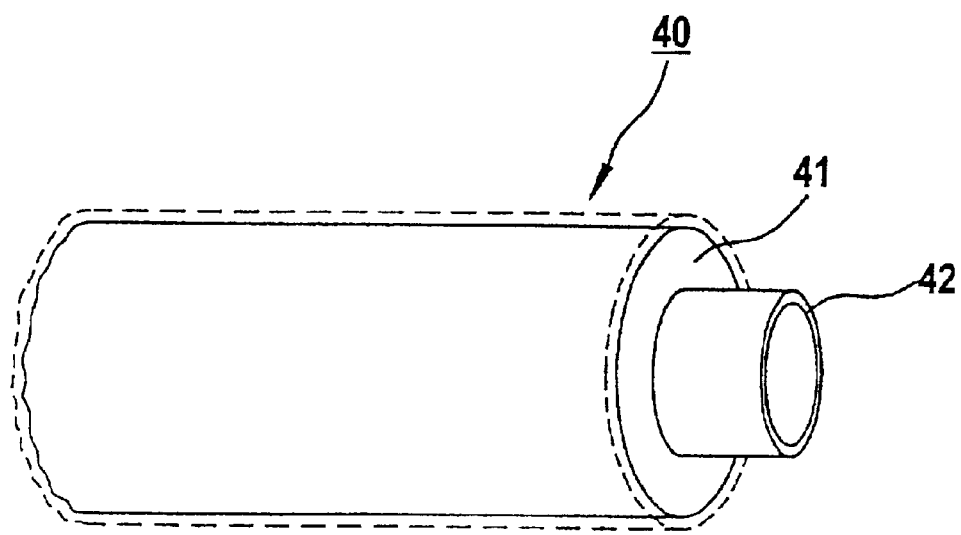
FIG. 10 is a perspective view of the cladding tube according to the second preferred exemplary embodiment.

In the second exemplary embodiment according to FIG. 10, a cladding tube 40 is formed of the matrix 41 with the composition 1.0±0.2% Nb, 0.14±0.02% O, remainder: zirconium of industrial purity, see Table 2 indicating under II the preferred limits for the constituents in similar compositions.

It can be seen in FIG. 8, under II, that, in the phase diagram of the alloy, at temperatures of up to 580° C. there is a stable α-phase in which about half the niobium is dissolved, while the remainder is precipitated as a stable β-phase of the niobium. At 580° C., there is a mixed phase α+β, in which virtually all the niobium is dissolved, while, at temperatures of above 960° C., only a β-phase of the zirconium, with the completely dissolved niobium, still exists.

The second zirconium alloy in a protective layer 42 of the cladding tube 40 is formed of the same ZrFe alloy as in the first preferred exemplary embodiment already described.

Figure 9:
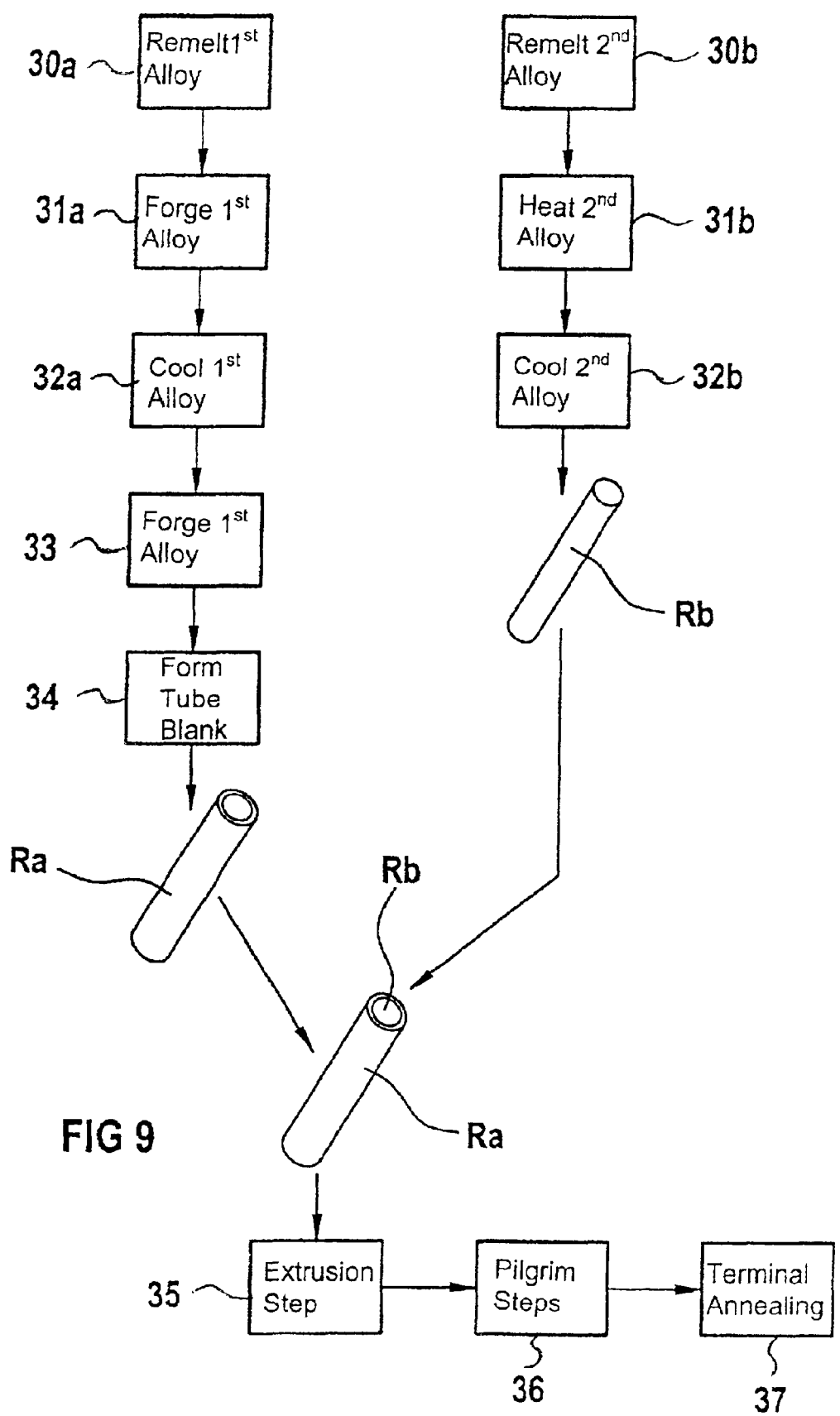
FIG. 9 is a flow diagram of method steps for producing the first exemplary embodiment.

To produce the cladding tube 40, a diagram according to FIG. 11, similar to that of FIG. 9, is obtained. In this case, however, after multiple remelting under a vacuum (step 50a) and forging in the Orange (temperatures of above 960° C.) (step 51a), the first zirconium alloy ZrNb of the matrix is quenched (step 52), a first tube blank Rc being produced from the matrix material, without the β-quenching (step 52a) being followed by thermal treatment with an appreciable parameter value A. A step of this kind is provided only for the second zirconium alloy of the protective layer, in which multiple remelting in a vacuum (step 50b) and forging in the β-range (step 51b) and annealing at temperatures of below about 600° C., in particular below 580° C. (α-range), take place. In this case, the second tube blank Rd is produced, which is inserted exactly into the interior of the first tube blank Rc. For the first tube blank Rc produced in steps 51a and 52a, virtually the parameter value A=0 is obtained, while, in steps 51b, 52b and 53, the second tube blank Rd can be produced with a parameter value below $2 \cdot 10^{-18}$ h. In the exemplary embodiment, $A=1 \cdot 10^{-18}$ h was set in step 53.

The two tube blanks inserted one into the other are welded to one another and extruded together, subsequently brought to the final dimensions of the cladding tube (step 55) in a plurality of pilgrim steps, with recovery annealings interposed between them, and subjected to terminal annealing 56. In steps 54 to 56, A lower than $0.5 \cdot 10^{-18}$ h is maintained, even values A lower than $0.1 \cdot 10^{-18}$ h being possible (here: $A=0.9 \cdot 10^{-18}$ h).

According to the value A being lower than $0.5 \cdot 10^{-18}$ (preferably, A lower than $0.2 \cdot 10^{-18}$, at all events at least lower than $0.3 \cdot 10^{-18}$) for steps 50a to 52a, in the finished cladding tube preferably a value A lower than $0.1 \cdot 10^{-18}$ h is obtained for the first zirconium alloy of the matrix 41, whereas a value $A=0.1$ to $3 \cdot 10^{-18}$ h, preferably between 0.2 and $1.5 \cdot 10^{-18}$ h, is obtained for the second zirconium alloy.

The cladding tubes produced in this way are filled with the columns of relatively highly enriched fuel pellets and with the high-pressure gas, are closed in a gastight manner by the end plugs and are inserted into the skeleton mentioned. They have a high burn-up which makes it possible to have a long period of utilization in the pressurized water reactor. When the pressurized water reactor is in operation, in the control of the power output the permissible rates of change need to be coordinated essentially only with the time constants defined by the physics of the fuel and of the reactor, only minor account needing to be taken of possible material damage which, even after lengthy operating times under part load, could occur on the cladding tubes when the reactor power output is being run up.

TABLE 1

| Element | Sponge Grade R60001 | Zry2 Grades R60802 R60812 | Zyr4 Grades R60804 R60814 | Zr/Nb Grade R60901 |
|---|---|---|---|---|
| Composition, Weight % | | | | |
| Tin | . . . | 1.20–170 | 1.20–170 | . . . |
| Iron | . . . | 0.07–0.20 | 0.18–0.24 | . . . |
| Chromium | . . . | 0.05–0.15 | 0.07–0.13 | . . . |
| Nickel | . . . | 0.03–0.08 | . . . | . . . |
| Niobium | ˆ. . . | ˆ. . . | ˆ. . . | 2.40–2.80 |
| Oxygen | | | | 0.09–0.13 |
| Iron + chromium + nickel | . . . | 0.18–0.38 | . . . | . . . |
| Iron + chromium | . . . | . . . | 0.28–0.37 | . . . |
| Maximum Impurities, Weight % | | | | |
| Aluminum | 0.0075 | 0.0075 | 0.0075 | 0.0075 |
| Boron | 0.00005 | 0.00005 | 0.00005 | 0.00005 |
| Cadmium | 0.00005 | 0.00005 | 0.00005 | 0.00005 |
| Carbon | 0.027 | 0.027 | 0.027 | 0.027 |
| Chromium | 0.020 | . . . | . . . | 0.020 |
| Cobalt | 0.0020 | 0.0020 | 0.0020 | 0.0020 |
| Copper | 0.0050 | 0.0050 | 0.0050 | 0.0050 |
| Hafnium | 0.010 | 0.010 | 0.010 | 0.010 |
| Hydrogen | 0.0025 | 0.0025 | 0.0025 | 0.0025 |
| Iron | 0.150 | . . . | . . . | 0.150 |
| Magnesium | 0.0020 | 0.0020 | 0.0020 | 0.0020 |
| Manganese | 0.0050 | 0.0050 | 0.0050 | 0.0050 |
| Molybdenum | 0.0050 | 0.0050 | 0.0050 | 0.0050 |
| Nickel | 0.0070 | . . . | 0.0070 | 0.0070 |
| Nitrogen | 0.0080 | 0.0080 | 0.0080 | 0.0080 |
| Silicon | 0.0120 | 0.0120 | 0.0120 | 0.0120 |
| Tin | 0.0050 | . . . | . . . | 0.0050 |
| Tungsten | 0.010 | 0.010 | 0.010 | 0.010 |
| Uranium (total) | 0.00035 | 0.00035 | 0.00035 | 0.00035 |

ˆ When so specified in the purchase order, oxygen shall be determined and reported. Maximum or minimum permissible values, or both, shall be as specified in the purchase order.

TABLE 2

| | I | | II | |
|---|---|---|---|---|
| | Min. | Max. | Min. | Max. |
| Sn | 1.0 (1.2)% | 1.8 (1.5)% | . . . | 1.2 (0.005) |
| Fe | 0.2 (0.24)% | 0.6 (0.5/0.4) | . . . | 1.2 (0.15) |
| Cr | (0.8/0.10/0.12) | 0.3 (0.25/0.20) | . . . | 0.3 (0.02) |
| Nb | . . . | . . . | 0.8 | 2.8 (1.3) |
| | | Remainder: "Zr sponge" with: | | |
| O | (0.10/0.12) | (0.20/0.18/0.16) | (0.10/0.12) | (0.20/0.18/0.16) |
| C | . . . | (0.01) | . . . | (0.02) |
| N | . . . | (0.005) | . . . | (0.005) |
| Si | (0.005/0.007) | (0.012) | . . . | (0.012) |
| P | . . . | (0.03) | . . . | (0.03) |

We claim:

1. A fuel element for a pressurized water reactor, comprising:
    a laterally open skeleton having control-rod guide tubes each with a first end and a second end, spacers fastened to said control-rod guide tubes, a fuel element head disposed at said first end of said control-rod guide tubes, and a fuel element foot disposed at said second end of said control-rod guide tubes; and
    gastight cladding tubes inserted into said skeleton and each filled with a column of fuel pellets, at least one of said gastight cladding tubes having a multilayer wall, said multilayer wall including:
        a mechanically stable matrix formed of a first zirconium alloy disposed in a middle of said multilayer wall, said first zirconium alloy containing 1.0 to 1.8% Sn, 0.2 to 0.6% Fe, and up to 0.3% Cr, a remainder being zirconium of industry purity, said first zirconium alloy having precipitations of secondary phases, a size of the precipitations corresponding to a standardized annealing duration of 2 to $80 \times 10^{-18}$ h; and
        a thinner protective layer of a second zirconium alloy alloyed to a lesser extent than said first zirconium alloy, said thinner protective layer bound metallurgically to said matrix and disposed on an inside of said matrix facing said fuel pellets, said second zirconium alloy containing at least 0.2% and up to 0.8% by weight of iron, a remainder being zirconium of industrial purity, said second zirconium alloy having precipitations of secondary phases, a size of the precipitations corresponding to a standardized annealing duration of about 0.1 to $3 \times 10^{-18}$ h.

2. The fuel element according to claim 1, wherein an iron content of said second zirconium alloy is 0.40±0.04% by weight.

3. The fuel element according to claim 1, wherein said first zirconium alloy contains 1.3±0.1% Sn; 0.28±0.04% Fe; 0.16±0.03% Cr; 0.01±0.002% Si and 0.14±0.02% O.

4. The fuel element according to claim 1, including flow guide blades being carried by at least said spacers in an upper part of said fuel element, on a side facing away from a flow of pressurized water, for intermixing the pressurized water.

5. The fuel element according to claim 1, including a further protective layer of a third zirconium alloy which is thinner than said matrix and is bonded metallurgically to an outside of said multilayer wall.

6. The fuel element according to claim 1, wherein said second zirconium alloy contains at least 0.30% by weight of iron, a remainder being zirconium of industrial purity.

7. The fuel element according to claim 1, wherein said second zirconium alloy contains at most 0.6% by weight, of iron, a remainder being zirconium of industrial purity.

8. The fuel element according to claim 1, wherein said first zirconium alloy contains at least 1.2% Sn, at least 0.24% Fe and at least 0.10% Cr, a remainder being zirconium of industrial purity.

9. The fuel element according to claim 1, wherein said first zirconium alloy contains at most 1.5% Sn, at most 0.5% Fe and at most 0.25% Cr, a remainder being zirconium of industrial purity.

10. The fuel element according to claim 1, wherein the size of the precipitations in said first zirconium alloy corresponds to a standardized annealing duration of $30 \pm 10 \cdot 10^{-18}$ h.

11. A method for producing a cladding tube for a fuel rod of a pressurized water reactor, which comprises the steps of:
    providing a first zirconium alloy containing 1.0 to 1.8% Sn, 0.2 to 0.6% Fe, and up to 0.3% Cr, a remainder being zirconium of industry purity;
    providing a second zirconium alloy containing at least 0.2% and up to 0.8% by weight of iron, a remainder being zirconium of industrial purity;
    thermally treating the first zirconium alloy and the second zirconium alloy differently and independent of one another, in each case solution annealing, with subsequent-different standardized annealing durations of 2 to $80 \times 10^{-18}$ h and 0.1 to $3 \times 10^{-18}$ h, respectively;

producing from the first zirconium alloy and at least the second zirconium alloy a multilayer composite tube, a wall of the multilayer composite tube containing, in a middle region, as a matrix, a thick layer of the first zirconium alloy, and to an inside of the thick layer of the first zirconium alloy a protective layer formed of the second zirconium alloy, the protective layer being bonded to the matrix metallurgically; and processing the multilayer composite tube further into a finished cladding tube, in such a way that the protective layer and the thick layer are subjected to substantial equivalent thermal conditions, without the solution annealing.

12. The method according to claim 11, which comprises forming the second zirconium alloy to contain 0.2 to 0.5% by weight of iron, a remainder being zirconium of industrial purity, and, before the production of the multilayer composite tube, the second zirconium alloy is treated at most with a standardized annealing duration of below $2 \times 10^{-18}$ h.

13. The method according to claim 11 which comprises forming the second zirconium alloy to contain 0.4±0.04% by weight of iron.

14. The method according to claim 11, which comprises further processing the multilayer composite tube into the finished cladding tube with a standardized annealing duration of below $3 \times 10^{-18}$ h.

15. The method according to claim 11, which comprises during the production of the multilayer composite tube, a third zirconium alloy is bonded metallurgically to the first zirconium alloy.

16. The method according to claim 11, which comprises subjecting the second zirconium alloy to a standardized annealing duration of about $1 \pm 0.5 \times 10^{-18}$ h before a production of the multilayer composite tube.

17. The method according to claim 11, which comprises forming the second zirconium alloy to contain 0.3 to 0.5% by weight of iron, a remainder being zirconium of industrial purity, and, before the production of the multilayer composite tube, the second zirconium alloy is treated at most with a standardized annealing duration of below $2 \times 10^{-18}$ h.

18. The method according to claim 11, which comprises further processing the multilayer composite tube into the finished cladding tube with a standardized annealing duration of below $2 \times 10^{-18}$ h.

19. A cladding tube for a fuel rod of a pressurized water reactor, in combination with a column of fuel pellets filled therein, comprising:

a multilayer wall, including:
a mechanically stable matrix formed of a first zirconium alloy disposed in a middle of said multilayer wall, said first zirconium alloy containing 1.0 to 1.8% Sn, 0.2 to 0.6% Fe, and up to 0.3% Cr, a remainder being zirconium of industry purity, said first zirconium alloy having precipitations of secondary phases, a size of the precipitations corresponding to a standardized annealing duration of 2 to $80 \times 10^{-18}$ h; and a thinner protective layer of a second zirconium alloy alloyed to a lesser extent than said first zirconium alloy, said thinner protective layer bound metallurgically to said matrix and disposed on an inside of said matrix facing said fuel pellets, said second zirconium alloy containing at least 0.2% and up to 0.8% by weight of iron, a remainder being zirconium of industrial purity, said second zirconium alloy having precipitations of secondary phases, a size of the precipitations corresponding to a standardized annealing duration of about 0.1 to $3 \times 10^{-18}$ h.

* * * * *